June 11, 1957  J. H. TAYLOR  2,795,045
LAWN EDGERS
Filed Oct. 2, 1953  2 Sheets-Sheet 1
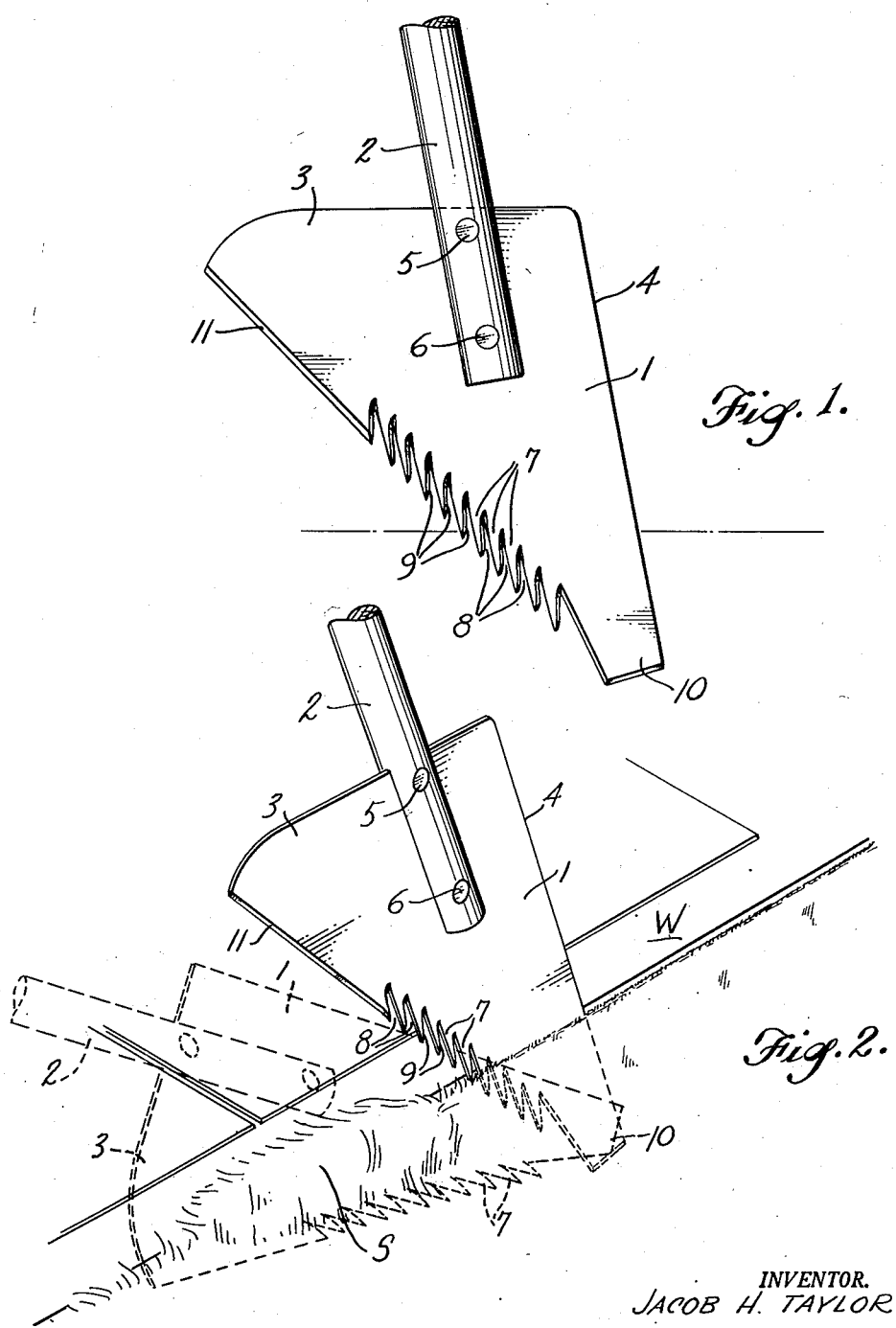
INVENTOR.
JACOB H. TAYLOR
BY
Reynolds, Beach & Christensen
ATTORNEYS June 11, 1957　　　　J. H. TAYLOR　　　　2,795,045
　　　　　　　　　　　　LAWN EDGERS
Filed Oct. 2, 1953　　　　　　　　　　2 Sheets-Sheet 2
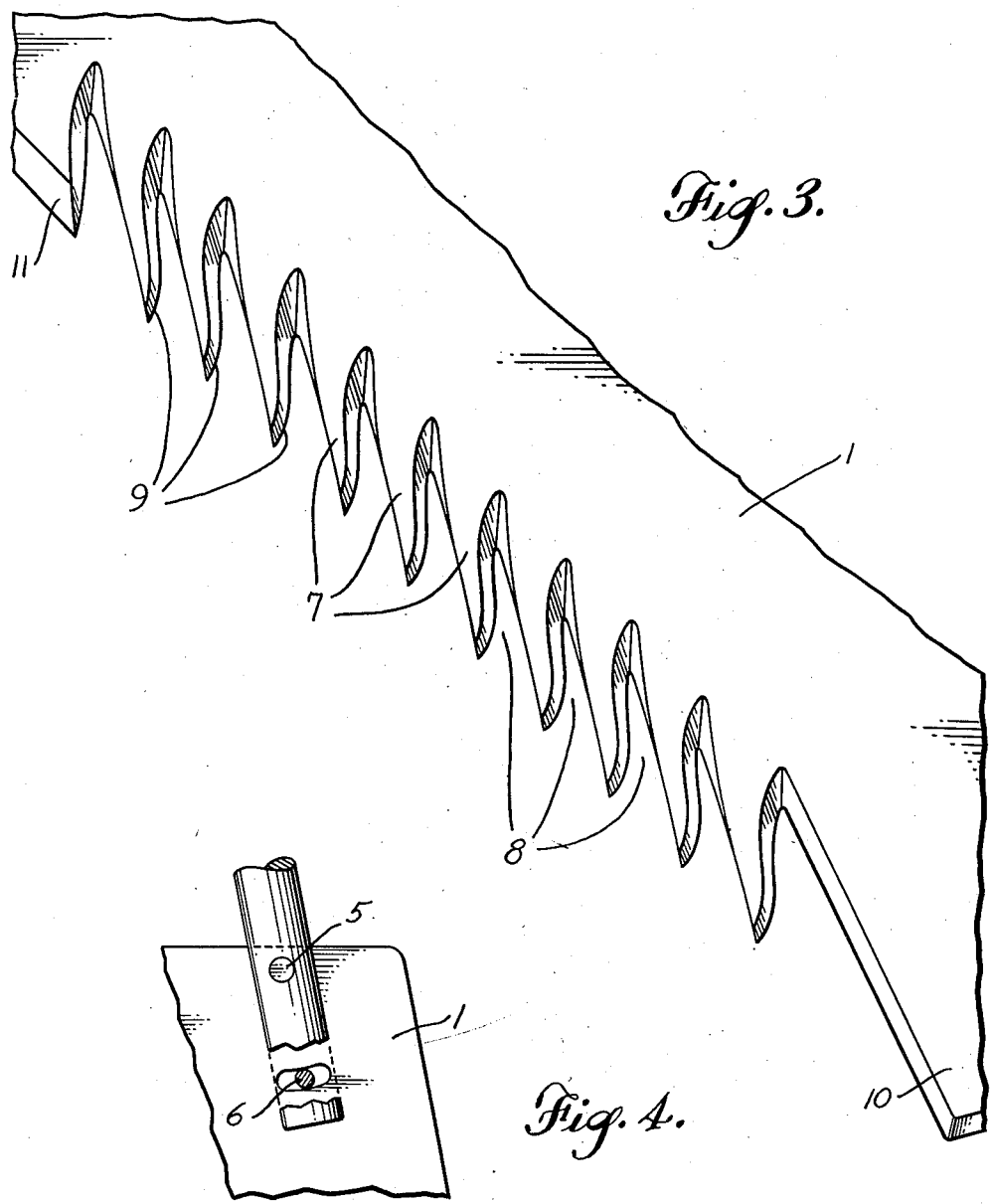
INVENTOR.
JACOB H. TAYLOR
BY
ATTORNEYS United States Patent Office 2,795,045
Patented June 11, 1957

2,795,045

LAWN EDGERS

Jacob H. Taylor, Longview, Wash., assignor to C. Richard Schneider, Longview, Wash.

Application October 2, 1953, Serial No. 383,898

3 Claims. (Cl. 30—314)

The present invention pertains to a blade type of lawn edger in which the blade is mounted on the lower end of a handle.

Various blade type lawn edgers have been proposed heretofore, but they have not been particularly satisfactory in use. To cut properly it has been necessary for the blades to be very sharp, and yet when the blades are pushed repeatedly into the dirt, they are necessarily dulled quickly. Unless the blades are resharpened frequently, therefore, they merely push the grass blades into the ground instead of cutting them off cleanly.

Lawn edgers having rotative blades have also been used, but these are more expensive to make and when their edges become slightly dull they also tend to press the grass blades into the dirt instead of severing them.

It is an object of the present invention, therefore, to provide a toothed lawn edger which is economical to manufacture and effective in use to cut the blades of grass along the edge of a lawn even though the tooth edges may become somewhat dulled after repeated use.

Especially it is an object to provide a blade lawn edger having a blade stationary relative to an elongated handle carrying it and with teeth defining grass blade confining notches between them and having cutting edges forming at least one edge of each notch. The tendency of such a blade notch is to sever the grass blades instead of to push them into the ground, because the cutting edges extend generally in the direction of blade movement instead of transversely of such direction.

To insure proper cutting action the teeth are long and the notches between them are narrow and deep.

Another object of the invention is to provide a lawn edger having a blade and handle arranged in coplanar relationship so that the edger will be reciprocated by the handle in a vertical plane for ordinary use. An additional cutting edge may be afforded adjacent to the grass blade cutting teeth for cutting sod more effectively.

In general the objects mentioned above may be accomplished by providing a lawn edger having a blade of approximately triangular shape, one side of which will be generally horizontal in use and another side substantially vertical. The handle also will extend substantially vertical, and the side of the blade inclined relative to the handle will have long teeth along a major portion of its length and a straight cutting edge over the remainder of its length.

Figure 1 is a side elevation view of the lawn edger according to the present invention, shown in the position of use, and Figure 2 is a top perspective view of the lawn edger in use, the upper portion of the handle being broken away in both instances.

Figure 3 is an enlarged side elevation view of a portion of the blade's toothed edge.

Figure 4 is a detail elevation view of adjustable handle attaching structure.

As previously mentioned, the lawn edger of this invention includes a blade 1 which is fixed relative to the handle 2. The blade itself will be made of high-grade steel, such as saw steel, so that it will be highly resistant to dulling abrasion by being pushed repeatedly through the soil.

The blade 1 is a plate of approximately right triangular shape, including a shorter edge 3 and a longer edge 4, disposed substantially perpendicular to each other, although the angle between these edges may be somewhat obtuse as shown in Figure 1. The handle 2 is disposed coplanar with the planar blade 1 and is disposed substantially parallel to the longer blade edge 4 adjacent to the substantially right angle corner of the blade. Since the handle 2 will be held upright in substantially vertical position when the edger is in use, the edge 4 also will be upright, and the edge 3 will be substantially horizontal. The handle 2 may be secured to the blade by rivets 5 and 6 spaced lengthwise of the handle and extending through holes in blade 1 spaced transversely of blade edge 3. One of the rivet receiving apertures of the blade may be a hole, and the other a short arcuate slot, as shown in Figure 4, so that exactly the desired angular relationship between the blade and the handle can be established at the time the rivets are set. Alternatively, one or both of the rivets may be replaced by nuts and bolts. If the securing member received in the blade slot is a bolt, it can be loosened at will to enable the angular relationship between the blade and handle to be altered, and then retightened to secure the handle and blade in fixed relationship again.

The hypotenuse or inclined edge of blade 1 has long closely-spaced teeth 7 arranged along it. The lengths of these teeth extend substantially parallel to handle 2 and the longer edge 4 adjacent to the substantially right angular corner of the blade and their points are directed away from the handle. Such teeth are located close together to form narrow deep notches 8 between them, as shown in Figures 1, 2 and 3. The length of each tooth 7 is a plurality of times as great as its maximum width, which is at the root of the tooth. Also the depth of each notch is a plurality of times as great as its maximum width adjacent to the tooth point. The teeth are in stepped relationship along the hyptotenuse or inclined edge of the blade, but the teeth points are quite close together because of the narrowness of the notches between the teeth and the angularity of the inclined blade side relative to the teeth lengths. Thus each tooth has a longer edge and a shorter edge, as shown.

The function of the notches 8 between the teeth is to receive and confine grass blades as the handle is moved downward. Because of the narrowness of the notches, each notch will receive few grass blades during one stroke, and because of the steepness of the edges of the notches they cannot press the grass blades into the dirt until they reach the closed ends of the notches between adjacent teeth. At least one edge of each notch, shown in Figures 1 and 3 as the shorter edge of the tooth, will be sharpened and adjacent to the closed end of each notch both edges are sharpened as shown in Figures 1 and 3, forming a groove extending lengthwise of the notch beyond its closed end, as shown. As the sharpened portions of the tooth edges move across the grass blade they will have a cutting movement which will certainly sever the grass blades by the time they reach the closed end of the notch, even though the edges 9 adjacent to the tips of the teeth indicated in Figures 1 and 3 are not very sharp. Figure 3 simply shows the toothed edge portion of the blade in Figure 1 on an enlarged scale, so that the shape of the notch edges and grooves can be seen more easily.

Beyond the end of the series of teeth 7 remote from handle 2 is a projecting end portion 10 of the blade which will remain in face-to-face engagement with the edge of a sidewalk W, even when the handle has been raised sufficiently to retract all the teeth 7 out of the ground. By sliding this projection in contact with the edge of the walk the teeth 7 will be moved up and down in a planar fashion to cut all the grass blades lying from the lawn over onto the edge of the walk. If the cutting edges 9 are beveled on only the side of the blade 1 opposite that which is engaged with the walk, as is preferred and shown in the drawings, movement of the opposite blade side against the walk edge will have a sharpening effect on these tooth edges so that they will tend to be maintained in sharp condition.

The series of teeth 7 may terminate along the inclined edge of the blade at a location spaced a considerable distance from the blade edge 3. The portion of the inclined blade edge between the blade edge 3 and the adjacent end of the teeth series may then have a sharpened beveled edge 11 which also may be beveled only toward one side of the blade, namely toward the same side as that toward which the teeth edges 9 are beveled. This elongated sharpened edge will be useful in cutting clumps of sod which may be encountered along the edge of a walk, such as indicated as S in Figure 2. To cut such clumps the handle 2 may be swung to lower the cutting edge 11 onto the sod, as the blade pivots about its projecting end 10. Such handle manipulation, however, is not necessary for cutting merely grass blades which are cut simply by reciprocating the handle 2 lengthwise up and down to cut the grass with the teeth 7 as the blades are confined in the notches 8 in the manner described.

I claim as my invention:

1. A lawn edger comprising an elongated handle having a planar blade plate on one end thereof in a plane generally parallel to said handle, an edge of said blade plate remote from said handle being inclined relative to said handle, and teeth formed on said inclined blade plate edge with their lengths generally parallel to the length of said handle, the tips of said teeth being directed away from said handle and having acute-angled notches there between, the edges of each notch at least adjacent to its closed end being beveled and thereby sharpened to a cutting edge, and a groove extending lengthwise of each notch beyond its closed end in continuation of the bevels of said beveled edges.

2. The lawn edger defined in claim 1, in which the notch edges are sharpened by beveling from one face only of the blade and the groove is in the face of the blade from which the notch edges are beveled.

3. A lawn edger comprising an elongated handle having a planar blade plate on one end thereof in a plane generally parallel to said handle, an edge of said blade plate remote from said handle being inclined relative to said handle, and teeth formed on said inclined blade plate edge along a portion only of its length with the lengths of said teeth generally parallel to the length of said handle, the tips of said teeth being directed away from said handle, said inclined blade plate edge also including a substantially straight portion beveled and thereby sharpened to a cutting edge.

References Cited in the file of this patent
UNITED STATES PATENTS

| | | |
|---|---|---|
| 80,765 | Quackenbush | Aug. 4, 1868 |
| 158,985 | Schultz | Jan. 19, 1875 |
| 1,033,485 | Steel | July 23, 1912 |
| 1,505,444 | Swanson | Aug. 19, 1924 |
| 2,467,327 | McKee | Apr. 12, 1949 |
| 2,517,840 | Chatlos | Aug. 8, 1950 |